No. 840,805. PATENTED JAN. 8, 1907.
A. RIEBE.
BALL BEARING.
APPLICATION FILED APR. 18, 1906.

WITNESSES:
Fred White
René Buine

INVENTOR:
August Riebe,
By his Attorneys
Arthur E Fraser Usina

UNITED STATES PATENT OFFICE.

AUGUST RIEBE, OF BERLIN, GERMANY.

BALL-BEARING.

No. 840,805.  Specification of Letters Patent.  Patented Jan. 8, 1907.

Application filed April 18, 1906. Serial No. 312,378.

*To all whom it may concern:*

Be it known that I, AUGUST RIEBE, engineer, a subject of the King of Prussia, German Emperor, residing in Berlin, 34/35 Huttenstrasse, in the Kingdom of Prussia, Germany, have invented certain new and useful Improvements Relating to or Connected with Ball-Bearings, of which the following is a full, clear, and exact description.

The invention relates to a ball-cage for double-grooved ball-bearings having undivided rings, which cage carries or separates the balls and which is composed of two flat rings held together by clamps, said rings being placed together edge to edge. These rings permit a certain expansion thereof in the movement of the balls, so that the cage, which normally may be regarded as fixed, when excessive pressure is exerted on the balls acts to a greater or lesser degree as an elastic cage.

In the accompanying drawings one form of construction of the device is shown.

Figure 1:
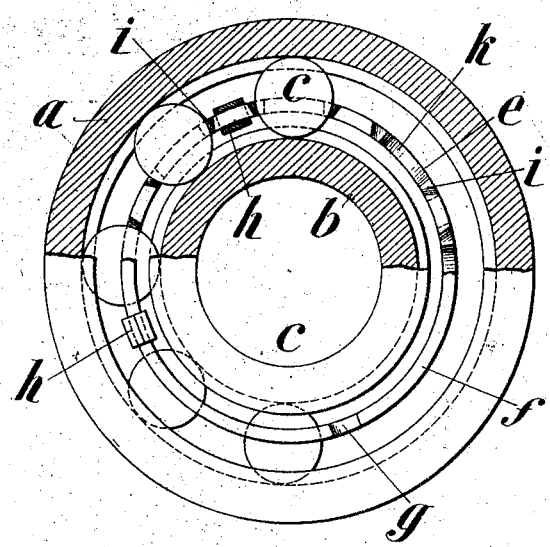
Figure 2:
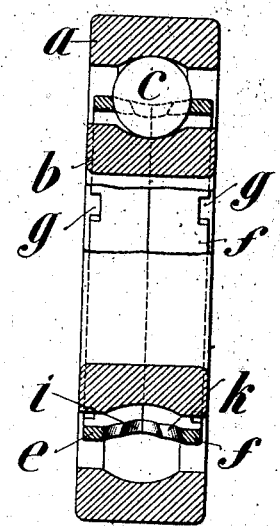
Figure 3:
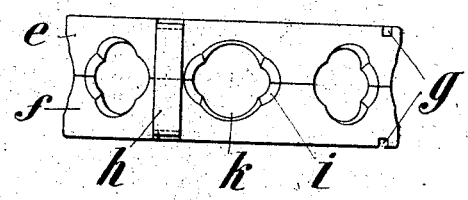
Figure 4:
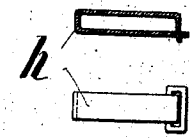

Figure 1 is a sectional elevation of a cage constructed according to the present invention applied to a ball-bearing. Fig. 2 is a vertical transverse section thereof. Fig. 3 is a plan of part of the cage separately. Figs. 4, 4ª, 5, 5ª, 6, and 6ª illustrate various forms of clamps.

As may be seen from the accompanying drawings, the cage consists of two flat rings $e$ and $f$, meeting or joined together at their edges. The balls engage and work in recesses $k$, formed part in each of the meeting edges of the rings $e$ and $f$. Both the rings $e$ and $f$ are held together by clamps $h$, several of which are arranged and distributed around the circumference of the cage.

Figure 5:
Figure 6:

The clamp $h$ is constructed to permit the rings to separate slightly in use. As shown in Fig. 4, the clamp comprises a strip of metal bent in rectangular form, one end being passed through the other. Sufficient space is left between the ends to permit one to move relatively to the other to a slight extent, thus permitting the rings to separate to a corresponding degree. This separation takes place when some of the balls move relatively faster than the others, and consequently cause a pressure of the balls against the rings. By this construction the cage is capable of acting as an elastic cage to a suitable degree, while ordinarily in the normal movement of the balls—that is, when the ball-pressure is normal—the cage acts as a rigid or almost rigid cage. This elasticity is increased when the clamps are formed as shown in Figs. 5 and 5ª and 6 and 6ª.

The ball-openings which are formed by the recesses $k$, provided in the meeting edges of the rings $e$ $f$, are themselves so formed that they permit the movement of the balls—that is, the elasticity of the cage—and at the same time considerably reduce the friction. For this purpose the recesses $k$ of the rings at the points of the greatest speed of the balls are provided with special recesses $i$, so that the former are only embraced on both sides by the edge, while at the time of the greatest speed said balls turn freely in the cage-rings. Thus a sticking or jamming of the balls at corresponding points of the cage is prevented and the friction reduced, while at the same time, as already mentioned, the expansion of the cage by the rotation of the balls is effected as the progressing balls, owing to the wedge-like pressing in of the same into the recesses $k$, occasion a slight separation of the rings.

Although I have described in detail the preferred construction of my invention, I do not wish to be limited thereto, as such construction may be considerably varied without departing from the invention. For instance, other means for yieldingly holding the rings against axial movement may be provided, and the rings themselves may be varied materially in construction while still retaining the advantages of the invention.

What I claim as my invention, and desire to secure by Letters Patent, is—

1. In a ball-bearing, a cage having two rings arranged edgewise and having ball-openings between them, and means for yieldingly opposing relative movement of such rings in an axial direction.

2. In a ball-bearing, a cage having two rings arranged edgewise and having ball-openings between them, and clamps for yieldingly holding such rings together.

3. In a ball-bearing, a cage having ball-openings, and having recesses leading to such openings, such openings being sufficiently restricted to prevent the balls from normally contacting with the ends of said recesses.

4. In a ball-bearing, a cage having two rings arranged edgewise and having ball-openings between them, and recesses leading from such openings, such recesses being adapted to receive the front or rear sides of the balls, and such openings and recesses being adapted to normally prevent the balls from contacting with the ends of said recesses.

5. In a ball-bearing, a cage having two rings arranged edgewise and having ball-openings between them, and recesses leading from such openings, such recesses being adapted to receive the front or rear sides of the balls so that they do not normally contact with the rings, and means for yieldingly opposing relative movement of such rings in an axial direction.

In witness whereof I have hereunto signed my name in the presence of two subscribing witnesses.

AUGUST RIEBE.

Witnesses:
 MAURICE ROUX,
 CHARLES CARDIVEL.